Aug. 10, 1937.   A. F. SANDERS   2,089,577
COMBUSTION CHAMBER OF FUEL INJECTION ENGINES
Filed June 26, 1935   2 Sheets-Sheet 1
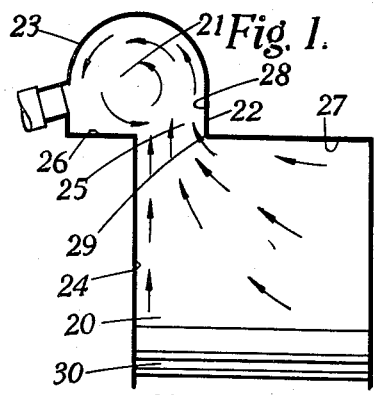
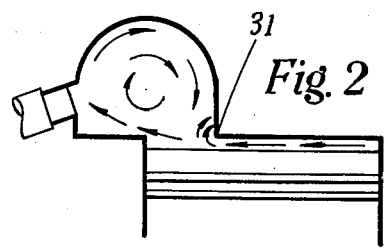
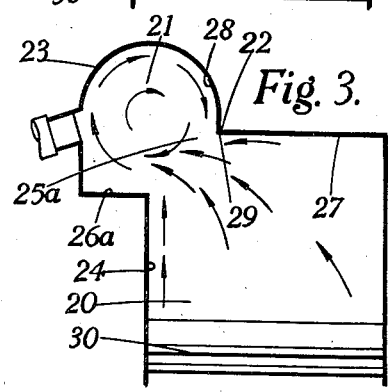
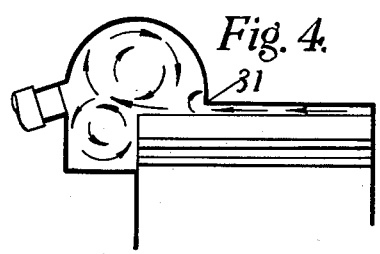
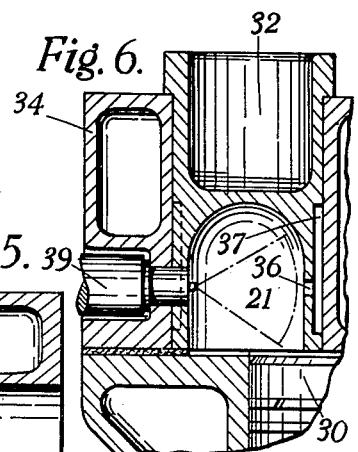
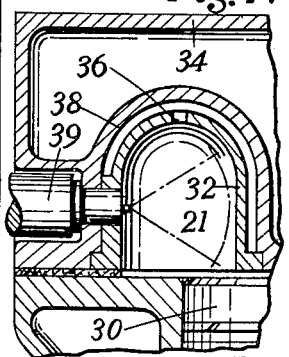
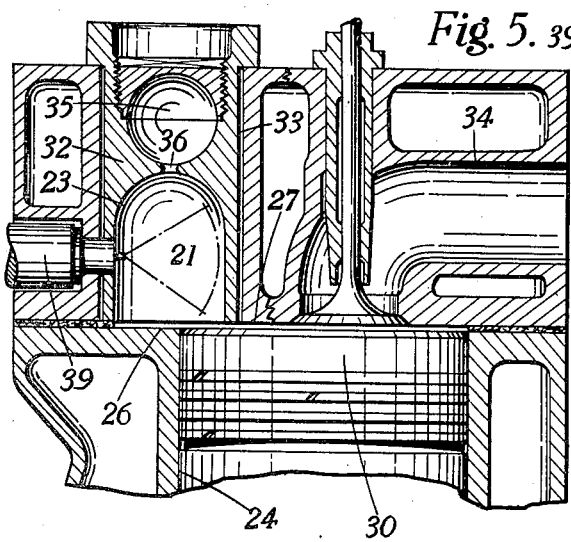
Inventor
Arthur F. Sanders
by Mawhinney & Mawhinney
Attorneys.

Aug. 10, 1937.  A. F. SANDERS  2,089,577
COMBUSTION CHAMBER OF FUEL INJECTION ENGINES
Filed June 26, 1935  2 Sheets-Sheet 2
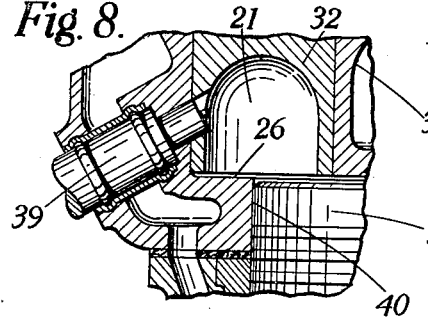
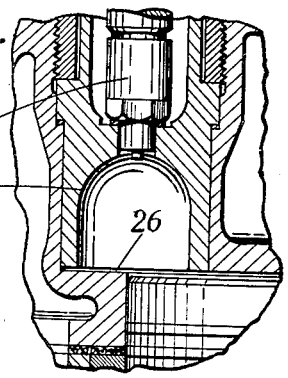
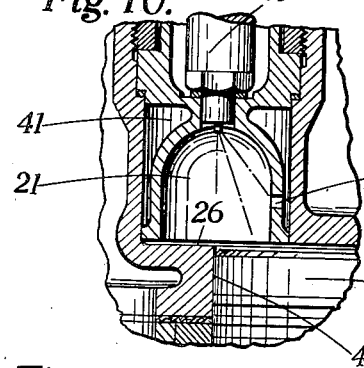
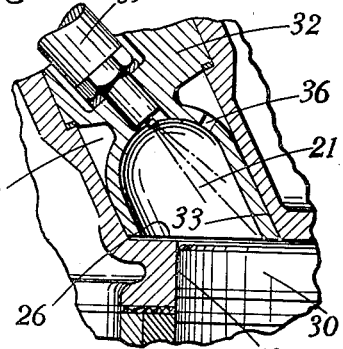
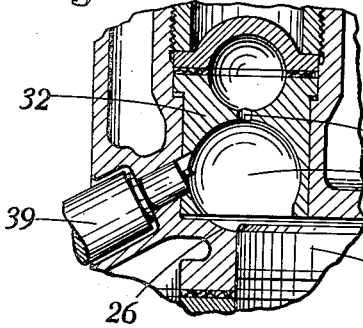
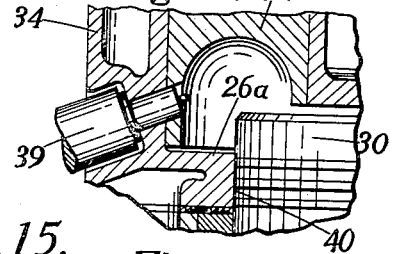
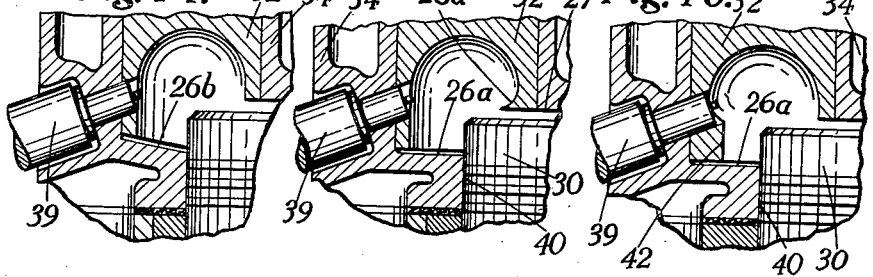
Inventor
Arthur F. Sanders
by Mawhinney & Mawhinney
Attorneys.

Patented Aug. 10, 1937

2,089,577

UNITED STATES PATENT OFFICE 2,089,577

COMBUSTION CHAMBER OF FUEL-INJECTION ENGINES

Arthur Freeman Sanders, Leeds, England, assignor of one-half to John Fowler & Co. (Leeds) Limited, Leeds, England Application June 26, 1935, Serial No. 28,561
In Great Britain July 28, 1934

2 Claims. (Cl. 123—32)

This invention relates to the combustion chambers of fuel-injection engines, and particularly to such as operate with compression ignition.

In the case of fuel-injection engines it is well known that towards the end of the compression stroke, and just prior to injection of fuel and/or to the initiation of combustion, the gaseous charge may have advantageously motion of two types. The first comprises massive vortex or swirl motion—that is, practically the whole charge is moving in one or more main vortices which serve to assist in pulverizing the fuel on injection or on segregation on ledges and to draw the stream of pulverized fuel as a streamer round the main compression chamber. The second comprises a confusion of multiple small vortices producing non-directional turbulence which disseminates and broadens the streamer of fuel or initially-ignited charge throughout the whole charge. This turbulence is relatively transient, as turbulence produced by the entry of charge into the cylinder is mainly damped out during the compression stroke. Hence it is advantageous to restore or intensify such turbulence towards the end of the compression stroke and during the injection and/or ignition period and during earlier post ignition or expansion stages of combustion.

In the case of such engines of the direct-injection type, i. e., those in which the compression chamber is an extension of the cylinder bore into which the fuel is directly injected, the vortex motion is indefinite and the turbulence slight as there is little or no renewal of such turbulence during compression, hence poor running is the result.

In the case of certain types of compression-ignition engine employing what is now commonly known as an air cell (that is, an auxiliary chamber into which the fuel is injected and which usually communicates with the cylinder bore by a restricted and relatively long passage, this air cell forming substantially the whole of the compression space), the configuration of such air cell is such that severe vortex action is set up during compression but turbulence is deficient. Further due to the flow of gaseous charge through the restricted passage and to excessive vortex motion cooling of the charge heated by compression renders starting from cold difficult, unless excessive compression ratios or some independent ignition or heating device be used.

The main object of the present invention is to provide an improved compression-ignition engine of the air-cell type with which the above disadvantages will be obviated. But the invention can with advantage also be applied to fuel-injection electric-ignition engines.

In the accompanying drawings, which illustrate two main types of combustion chamber for compression-ignition engines according to the invention:—

Figure 1 is a diagram of one type, indicating the motion of the charge during the compression stroke at the beginning thereof;

Figure 2 is a view similar to that of Figure 1 indicating the motion of the air just as the piston reaches top dead centre on the compression stroke;

Figures 3 and 4 are similar views to those of Figures 1 and 2, respectively, as regards the other type of compression-ignition engine; and Figures 5 to 16 are fragmentary part-sectional elevations of combustion chambers formed according to one or other of these types and incorporating various distinctive features, the piston in each case being shown at top dead centre where the clearance between the piston and the cylinder head is only that necessary for mechanical reasons.

Like numerals indicate like parts throughout the drawings.

A fuel-injection engine, according to the main feature of the invention, has a compression space so proportioned and arranged that during the earlier part of the compression stroke an orderly swirl of air is set up in it about an axis sensibly perpendicular to the cylinder axis and such that during the final part of the compression stroke a definite swirl is caused in the compression space in a direction opposite to that of the first swirl. Thus, the original swirl may be turned into a swirl in the opposite direction, or, alternatively, it may be broken up into two main swirls one of which is in the same direction as the original while the other is in the opposite direction. The fuel-injector preferably has its outlet at the edge or in the stream of the final swirl or one of the final swirls.

The compression space is preferably of compact form mainly outside the cylinder bore and offset from the cylinder axis so that the centre of the compression space is more or less in the line of the adjacent portion of the cylinder bore, the compression space communicating directly with the cylinder bore through an opening having no connecting duct or one of which the length is so small in relation to its cross-sectional area that the duct exerts no dominating effect upon the mean direction of the air flow into the compression space during the compression stroke of the piston.

The fuel injection should commence at the moment approximately when the initial orderly swirl is first interrupted. The fuel should, for preference, be injected across and downstream of the final swirl rather than upstream, in order to extend the length of the streamer for a given period of fuel injection, though satisfactory results may be obtained if the injection is substantially transverse to the swirl.

A further important feature of the invention consists in this, that the wall of the compression space nearest the cylinder axis makes a right-angle or an acute angle with the appropriate face of the cylinder head, leaving a sharp edge of negligible radius. In this event, during the final portion of the compression stroke when the main rush of air into the compression space is across the face of the piston, intense turbulence is set up beyond the sharp edge. Conversely, during the expansion stroke turbulence is set up on the other side of this sharp edge, thus promoting combustion during the initial combustion and expansion period.

The injector can with advantage be arranged so that some fuel is injected towards this sharp edge; then, when starting, fuel that tends to collect there in drops is blown off during the last stage of the compression stroke and very thoroughly atomized; so much so that without the addition of any artificial heating means whatever it is usually possible, in the case of a compression-ignition engine, to obtain ignition on the first or any way on the second compression stroke when starting from cold.

If desired there may be associated with this main compression space a second smaller compression space entirely outside the cylinder bore and communicating with the main one preferably by one or more small openings, but not directly communicating with the interior of the cylinder bore. As is well understood, the discharge of compressed air from such further compression space serves for promoting turbulence in the later stages of the expansion stroke, thus ensuring that very complete combustion will be obtained.

In the type of engine illustrated by Figures 1 and 2, the arrows represent diagrammatically the air flow in the cylinder bore 20 and in the compression space 21. This latter in this instance has a cylindrical wall portion 22 connected at its outer end remote from the crankshaft to a dome-shaped wall 23. The compression space is a compact one, it will be observed, and its centre is substantially aligned with the wall 24 of the cylinder bore, the compression space being materially offset from the cylinder axis. The opening 25 interconnecting the cylinder bore and the compression space (which opening is bounded by the arcs of two intersecting circles) is a relatively wide one of no axial length. In other words the lower wall 26 of the compression space is not at a higher level than the underface 27 of the cylinder head. The side 28 of the compression space nearest the cylinder axis makes an angle which is at least as great as 90° with the face 27 of the cylinder head, and it terminates with a sharp edge 29. The radius of this edge should be kept to a minimum, as is possible if the two faces be machined.

In operation, at the beginning of the compression stroke and during the main portion thereof the mean direction of air flow into the compression space, as shown in Figure 1, is such as to cause an orderly swirl therein in a counter-clockwise direction about an axis which is sensibly perpendicular to the cylinder axis. This swirl continues until the piston 30 has almost reached top dead centre when the air flow transversely of the cylinder bore, i.e., across the face of the piston, increases rapidly, thus causing the mean direction of air flow into the compression space to swing to the left across the centre of the orderly swirl pictured in Figure 1. This breaks up the swirl into a number of independent vortices, i. e., produces non-directional turbulence. Almost immediately, however, the mean direction of air flow into the compression space consists almost entirely of the air flow across the face of the piston, whereupon a definite swirl is set up in the opposite direction, i. e., a clockwise direction, as shown by Figure 2, this swirl carrying with it the independent vortices. The fuel is injected into this swirl, the outlet of the injector extending into the edge of it. With a view to ensuring that the streamer of fuel will be well spread out the centre line of injection is preferably at or above the centre of the swirl, so that the direction of injection will have a material component extending downstream. The injection conveniently commences at about 18° before top dead centre.

It should also be noted that during the final portion of the compression stroke the air rushing across the face of the piston, as shown in Figure 2, forms violent local vortices just beyond the sharp edge 29, as indicated at 31. Conversely, at the beginning of the expansion stroke when the main rush of air is again momentarily across the piston face but in the other direction to that shown in Figure 2, intense non-directional turbulence is set up on the other side of the sharp edge 29, such turbulence serving for post-ignition purposes.

In the modification illustrated by Figures 3 and 4 the lower wall 26a of the compression space is "dropped", so to speak, the opening 25a between the compression space 21 and the bore 20 thus extending diagonally across the corner of the cylinder. During the initial portion of the compression stroke the mean direction of air flow, as indicated by the arrows in Figure 3, is such as to cause clockwise swirl in the compression space. When the piston 30 reaches the lower wall 26a the mean direction of air flow into the compression space changes, and during the final movement of the piston towards top dead centre the air forced across the face of the piston cuts across the original swirl, as indicated by the arrows in Figure 4, introducing non-directional turbulence and causing a residual swirl of the same sense as the original in the upper portion of the compression space and a swirl in the opposite direction in the lower portion of the compression space.

With reference to Figure 4, it may here be mentioned that the ratio of the volume of the "dropped" portion of the compression space (i. e., that below the piston face at top dead centre) to the whole of the compression space should for preference be somewhere in the neighbourhood of 0.275 to 1. Increase or decrease beyond this ratio is again followed by an increasingly-unsatisfactory performance.

With each of the above types of engines an orderly swirl is set up in the compression space about an axis which is sensibly perpendicular to the cylinder axis during the initial part of the compression stroke, and during the final part a definite swirl is set up in the compression space in a direction opposite to that of the first swirl. In between some portion at least of the original orderly swirl is broken up into non-directional turbulence and some of these individual vortices are carried round in the final swirl.

Constructional arrangements of the first type of engine are illustrated by Figures 5 to 12. The compression space 21, it will be observed, is formed in a plug 32 fitted in an appropriate cavity 33 of the cylinder head 34, and, in point of fact, it is shown as being slightly longer and narrower than that of Figures 1 and 2. For the best results to be obtained the centre of the compression space should be within, say, a thirty-second of an inch of the adjacent edge 24 of the cylinder bore in the case of a piston of about four and a half inches diameter and having a stroke of about seven inches.

Figure 5 also shows an auxiliary compression space 35 of spherical form connected with the main compression space 21 by the narrow opening 36. In Figure 6 an auxiliary space 37 of annular form connects with the main compression space through the opening 36. In Figure 7 the auxiliary compression space 38 is of cup-shaped form. These auxiliary compression spaces are not essential, however, and none is shown in Figure 8.

This latter figure shows a fuel injector 39 tilted so that the injection will very definitely be downstream of the final swirl, whereas in Figures 5 to 7 the injection is mainly at right-angles to the final swirl. In addition, Figure 8 shows the upper part 40 of the cylinder bore as being formed in the cylinder head, a feature which is also shown in Figure 9 where the injector 39 is arranged to extend through the dome-shaped roof 23 of the compression space.

It should be noted that in the constructions of Figures 5 to 7 some of the fuel is injected directly across towards the sharp edge 29.

Figure 10 shows an arrangement which differs from that of Figure 9 by the provision of the auxiliary compression space 41, and a substantially similar arrangement is shown in Figure 11, except that here the cavity 33 of the cylinder head is inclined, the plug 32 being correspondingly shaped. Figure 12 shows a main compression space 21 which is substantially spherical, and in both Figures 11 and 12 the injection is well downstream of the final swirl.

Figures 13 to 16 show constructional forms of the second type of engine indicated by Figures 3 and 4. In all of these examples the upper part 40 of the cylinder bore is arranged in the cylinder head, and no auxiliary compression spaces are shown. In Figure 14 the lower wall 26b of the compression space is inclined. In Figure 15 the side wall 28a of the compression space nearest the cylinder axis makes an acute angle with the underface 27 of the cylinder head. In Figure 16 the wall 42 of the compression space remote from the cylinder axis is set slightly inwardly.

With all the combustion chambers of Figures 5 to 16, easy starting and efficient running can be obtained.

What I claim as my invention and desire to secure by Letters Patent of the United States is:—

1. In a fuel-injection compression-ignition engine, an engine body having a bore therein, and a flat-topped piston mounted in the bore to reciprocate therein and adapted to sweep substantially the whole of the outer end of the bore, said engine body having therein a compression space offset radially from the central axis and disposed outwardly of the bore and opening at its bottom directly into the upper end of the bore, said space having a rounded dome with its center of curvature substantially in line with a side wall of said bore and having its bottom wall spaced a considerable distance below said center of curvature and lying substantially in the plane of the upper end of said bore, whereby during the beginning of the compression stroke a uniform swirl of air will be set up in one direction in the compression space about an axis perpendicular to the axis of the bore and upon the close approach of the piston to its top dead center position said uniform swirl of air will be interrupted and a non-directional turbulence of air will take place, and whereby during the final movement of the piston to its dead center top position will result in a substantially uniform swirling of the air in an opposite direction.

2. A fuel injection engine having a cylinder bore with a piston therein, and having a compression cavity opening into the top of the bore at one side of the axis thereof, said cavity having a spherical top wall portion with its center point disposed in the plane of the adjacent side wall of the bore and spaced thereabove a distance equal substantially to the radial distance of the top wall from the center point, whereby the compression stroke of the piston effects an air stream having a resulting axis composed of a greater longitudinal and a lesser transverse stream components relatively to the piston stroke to direct the air stream inwardly of said center point of the compression cavity and create an anti-clockwise vortex, whereby as the said longitudinal and transverse components approach and reach equality said axis of the air stream approaches and coincides with said center point and effects turbulence in the cavity and subsequently as the transverse component becomes greater than the longitudinal component said axis of the air stream passes outwardly of the center point and effects a clockwise vortex in the compression cavity.

ARTHUR FREEMAN SANDERS.